Oct. 30, 1956      G. H. ELLIOTT      2,768,440

METHOD OF MAKING DENTURES

Filed Aug. 27, 1952

Gilbert H. Elliott
INVENTOR

BY C. A. Snow & Co.
ATTORNEYS.

United States Patent Office 2,768,440
Patented Oct. 30, 1956

2,768,440

METHOD OF MAKING DENTURES

Gilbert H. Elliott, Alberton, Transvaal, Union of South Africa

Application August 27, 1952, Serial No. 306,589

1 Claim. (Cl. 32—2)

This invention involves a method of making dentures, the primary object of the invention being to provide artificial plastic teeth made in units, to the end that the denture is preferably stronger than dentures wherein the teeth are set individually in the denture bases in the usual and well known manner.

An important object of the invention is to provide a method of making dentures wherein the tooth units of the dentures are made in one piece of plastic material pre-formed in various standard sizes to be selected by the dental technician in determining a particular unit for the particular shape of the mouth being fitted, the units being mounted on a base molded to the shape of the mouth of the person using the denture, for the comfort of the user.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
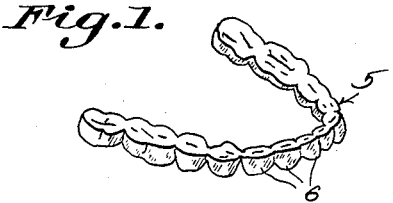
Figure 1 is a perspective view of a plastic tooth unit embodying a plurality of integral teeth, constructed in accordance with the invention.
Figure 2:
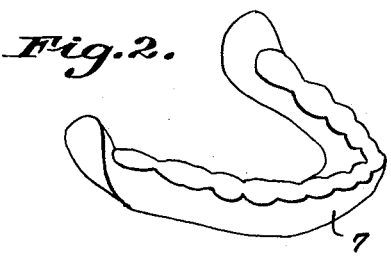
Fig. 2 is a perspective view of a dental base or palatial shaped to receive a tooth unit.
Figure 3:
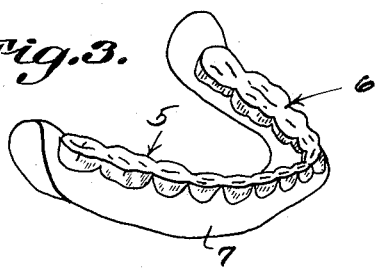
Fig. 3 is a perspective view illustrating a denture constructed in accordance with the invention.
Figure 4:
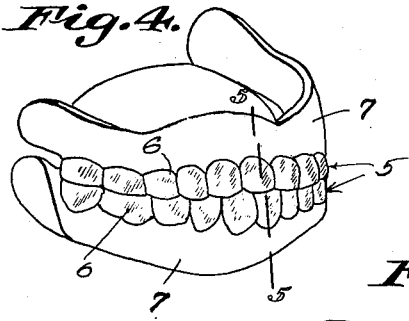
Fig. 4 is a view illustrating upper and lower cooperating plates or dentures constructed in accordance with the invention.
Figure 5:
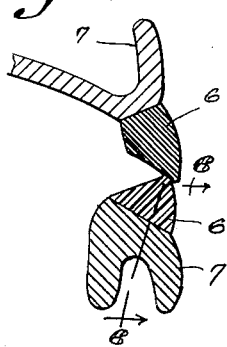
Fig. 5 is a sectional view taken on line 5—5 of Fig. 4.
Figure 6:
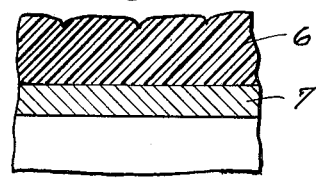
Fig. 6 is a sectional view taken on line 6—6 of Fig. 5.

Referring to the drawing in detail, the reference character 5 indicates a tooth unit wherein the teeth 6 thereof are formed integral with each other in a line so that one tooth is braced by the adjacent tooth or teeth.

It might be stated that it is contemplated to construct the tooth units in three standard sizes, since it is a known fact that the arches or that part of the mouth wherein the original natural teeth were located before extraction, can be classified as small, medium and large arches, and in each of these three classes the arch may be narrow and wide. Therefore, the tooth units will be constructed in standard sizes, of small, medium and large arches, as well as narrow and wide arches.

In forming dentures in accordance with the present method, the bases or palatals 7 are constructed, to fit the mouth by the well known wax forming process, and finally reproduced in plastic by the well known molding process. After the palatals or bases 7 have been properly formed in wax the dental technician will select a tooth unit of standard size which most nearly conforms to the curvature of the palatal or base, to be fitted with teeth. If the tooth unit does not exactly fit the curvature of the palatals or base, the tooth unit may be treated by the application of heat and curved to form the desired arch. The teeth units will then be secured in the final reproduction of the wax in plastic to the palatals or bases in the usual and well known manner.

From the foregoing, it will be seen that due to the construction shown and described, I have provided a method of constructing dentures wherein the teeth of the dentures embody single units of connected or integral teeth, with the result that the teeth are braced with respect to each other and the strength of the denture increased considerably over dentures wherein the teeth are placed in the palatals or bases individually.

It might be further stated that when it is desired to use the method in constructing dentures wherein a full set of teeth is not required, the desired number of teeth of a tooth unit constructed in accordance with the present invention may be removed by cutting off the desired number of teeth from the unit.

Having thus described the invention, what is claimed is:

A method of producing dentures consisting in providing an arched tooth unit embodying a line of integral teeth of preformed contour constructed of material bendable under the action of heat, molding a denture base to fit the jaw of the mouth with which the denture is used, bending the tooth unit to fit said denture base, and finally securing the arched tooth unit to said base.

References Cited in the file of this patent

UNITED STATES PATENTS

| | | |
|---|---|---|
| 2,419,248 | Blanchard | Apr. 22, 1947 |
| 2,539,882 | Zilinski | Jan. 30, 1951 |